United States Patent
Davlantes et al.

(10) Patent No.: US 12,500,455 B1
(45) Date of Patent: Dec. 16, 2025

(54) WIRELESS COMMUNICATION AND/OR POWER TRANSMISSION METHOD AND SYSTEM

(71) Applicant: Reach Power, Inc., Redwood City, CA (US)

(72) Inventors: Christopher Joseph Davlantes, Emeryville, CA (US); Hunter Scott, Emeryville, CA (US); Varun Ramaswamy, Emeryville, CA (US)

(73) Assignee: Reach Power, Inc., Redwood City, CA (US)

( * ) Notice: Subject to any disclaimer, the term of this patent is extended or adjusted under 35 U.S.C. 154(b) by 0 days.

(21) Appl. No.: 19/238,992

(22) Filed: Jun. 16, 2025

Related U.S. Application Data (60) Provisional application No. 63/660,395, filed on Jun. 14, 2024.

(51) Int. Cl.
*H02J 50/20* (2016.01)
*H02J 50/80* (2016.01)
*H04W 72/0453* (2023.01)

(52) U.S. Cl.
CPC .............. *H02J 50/20* (2016.02); *H02J 50/80* (2016.02); *H04W 72/0453* (2013.01)

(58) Field of Classification Search
CPC ...... H02J 50/20; H02J 50/80; H04W 72/0453
USPC ........................................................ 307/104
See application file for complete search history.

(56) References Cited

U.S. PATENT DOCUMENTS

| | | | | |
|---|---|---|---|---|
| 11,333,798 | B2* | 5/2022 | Raeker | G02F 1/01 |
| 11,476,714 | B2* | 10/2022 | Arnstein | H02J 50/90 |
| 11,611,242 | B2* | 3/2023 | Davlantes | H02J 50/23 |
| 12,374,931 | B2* | 7/2025 | Naderi | H01Q 9/0407 |
| 2012/0280575 | A1 | 11/2012 | Kim et al. | |
| 2018/0145544 | A1 | 5/2018 | Park et al. | |
| 2020/0396702 | A1 | 12/2020 | Navarro et al. | |
| 2021/0234408 | A1* | 7/2021 | Abiri | B60R 16/03 |
| 2022/0037930 | A1* | 2/2022 | Sounas | H02J 50/27 |

* cited by examiner

*Primary Examiner* — Alfonso Perez Borroto
(74) *Attorney, Agent, or Firm* — Jeffrey Schox; Samuel Rosenthal (57) ABSTRACT

A communication method, preferably including assigning frequency bands, determining encodings, transmitting signals, receiving signals, and/or decoding signals. The communication method can optionally include calibrating frequency bands and/or acting based on signals. A power transmission method, preferably including wirelessly transmitting power via propagating electromagnetic radiation from one or more power transmitters to one or more target nodes and/or employing the communication method at one or more target nodes and/or one or more power transmitters. A communication system, preferably including one or more receivers and one or more transmitters. The communication system can optionally include one or more control nodes. A power transmission system, preferably including one or more power transmitters and one or more target nodes.

10 Claims, 4 Drawing Sheets

WIRELESS COMMUNICATION AND/OR POWER TRANSMISSION METHOD AND SYSTEM

CROSS-REFERENCE TO RELATED APPLICATIONS

This application claims the benefit of U.S. Provisional Application No. 63/660,395, filed 14 Jun. 2024, which is herein incorporated in its entirety by this reference.

TECHNICAL FIELD

This invention relates generally to the wireless communication field, and more specifically to a new and useful wireless communication method and system.

DETAILED DESCRIPTION OF THE INVENTION

The following description of the preferred embodiments of the invention is not intended to limit the invention to these preferred embodiments, but rather to enable any person skilled in the art to make and use this invention.

1. Overview

Figure 1:
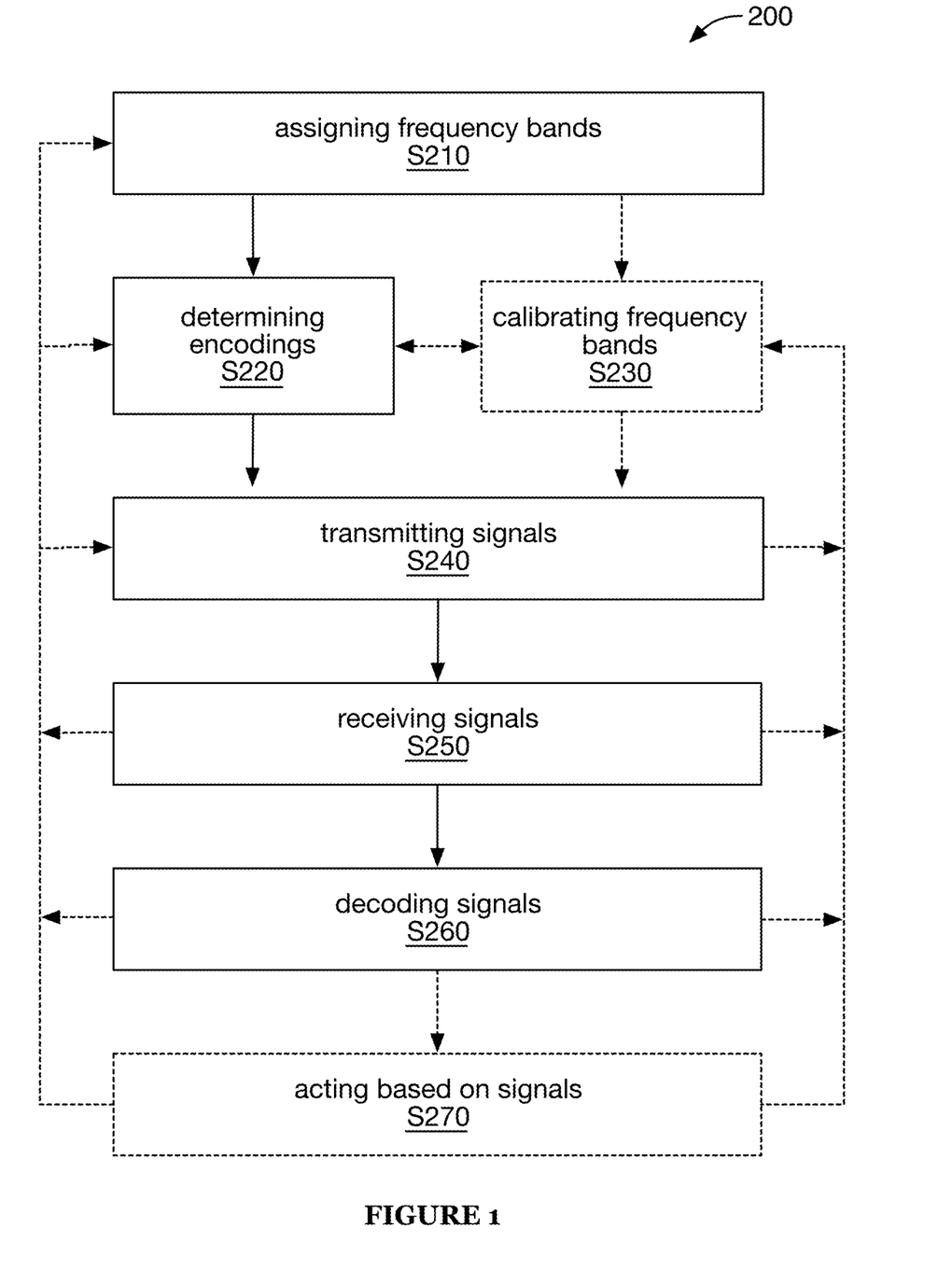
FIG. 1 is a schematic representation of an embodiment of a communication method.

A communication method 200 preferably functions to enable rapid (e.g., low latency) wireless communication between entities. The communication method preferably includes: assigning frequency bands S210, determining encodings S220, transmitting signals S240, receiving signals S250, and/or decoding signals S260 (e.g., as shown in FIG. 1). Further, the communication method can optionally include calibrating frequency bands S230 and/or acting based on signals S270. However, the communication method can additionally or alternatively include any other suitable elements performed in any suitable manner.

Figure 2:
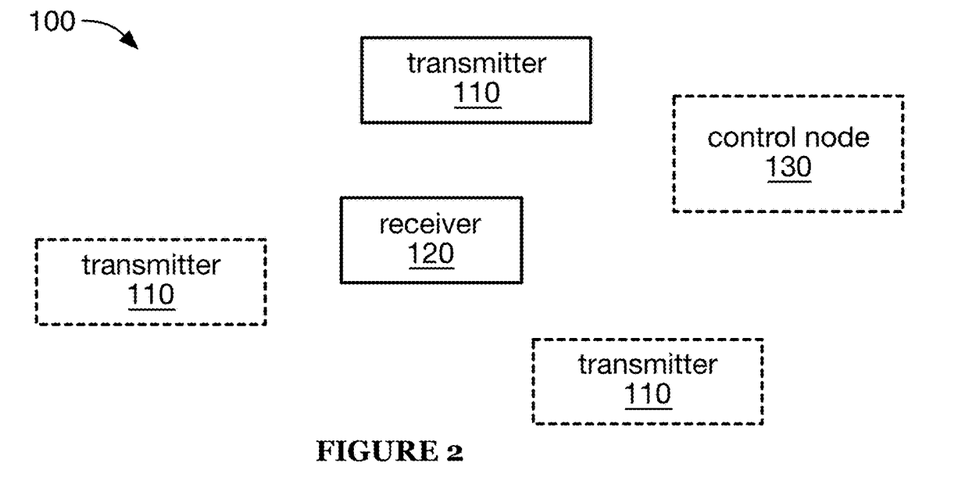
FIG. 2 is a schematic representation of an embodiment of a communication system.

The communication method 200 is preferably performed using a communication system 100. The communication system preferably includes a receiver 120 (or multiple receivers) and one or more transmitters 110 (e.g., as shown in FIG. 2). Further, the communication system can optionally include one or more control nodes 130. The receiver(s), transmitters, and/or control nodes each preferably include a communication module (e.g., enabling bidirectional communication between communication modules of the different elements, preferably via one or more standard communications protocols, such as Bluetooth). In some examples, one or more elements (e.g., transmitters and/or receivers) of the system 100 can be operable to act as both transmitters and receivers. In a first such example, the element(s) can be operable to switch between a transmission mode and a receiving mode. In a second such example, the element(s) can be operable to act concurrently or substantially concurrently as both a transmitter and a receiver, such as wherein the element can act as a receiver for a first set of transmitters (and/or for other elements operable to act as a transmitter) while acting as a transmitter for another receiver (and/or for another element operable to act as a receiver), such as wherein the element is operable to relay information from other transmitter(s) to the downstream receiver(s) and/or is operable to receive information from other transmitter(s), determine derivative information based on the received information, and transmit the derivative information (and/or any suitable information indicative of the derivative information) to the downstream receiver(s). However, the communication system can additionally or alternatively include any other suitable elements.

In some embodiments, the system and/or method can include one or more elements (e.g., the entire system and/or any suitable elements thereof, the entire method and/or any suitable elements thereof, etc.) such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference.

2. Method 2.1 Assigning Frequency Bands.

Assigning frequency bands S210 preferably functions to assign (e.g., from a wider band) a non-overlapping frequency band to each transmitter. Assigning the frequency bands can optionally include allocating guard bands between the assigned frequency bands.

The frequency bands can be assigned by a control element (e.g., the receiver, a separate controller, a lead transmitter of the set of one or more transmitters, etc.). Additionally or alternatively, the frequency bands can be assigned by a consensus process (e.g., via collaboration between some or all entities of the system).

In embodiments in which the method is performed using only one transmitter, the method can optionally omit assigning frequency bands (e.g., wherein a predetermined frequency band is used by the transmitter).

Assigning the frequency bands is preferably mediated via the communication modules of each element involved in assigning frequency bands (e.g., wherein the receiver communicates with each transmitter via their respective communication modules to send a respective frequency band assignment to each transmitter), but can additionally or alternatively be mediated in any other suitable manner. The assigned frequency bands are preferably communicated to one or more entities of the system (e.g., to the transmitter for which the frequency band has been assigned, if not assigned by that transmitter; to the receiver and/or other entity that will receive and/or decode the signals, if not assigned by that entity; etc.). Communication of the assigned frequency bands is preferably performed using the communication modules of any elements involved in such communications, but can additionally or alternatively be communicated in any other suitable manner.

Assigning frequency bands is preferably performed during communications initialization (e.g., when and/or in response to configuring communications between the receiver and the one or more transmitters). Assigning frequency bands can additionally or alternatively be performed in response to changes in the set of one or more transmitters (e.g., in response to adding a new transmitter to the set, removing a transmitter from the set, etc.). However, the frequency bands can additionally or alternatively be assigned with any other suitable timing.

In some embodiments, assigning frequency bands can include: determining one or more frequency ranges available for use S211; for a set of transmitters to which frequency bands are to be assigned, determining a size (e.g., cardinality) of the set of transmitters S212 (i.e., determining the number of transmitters in the set); and/or assigning a frequency band to each transmitter of the set S213 (or to any suitable subset thereof).

Determining the one or more frequency ranges S211 can include selecting one or more ranges (e.g., from a predetermined set of available ranges, based on current and/or planned frequency utilization, etc.), receiving an assignment of one or more frequency ranges (e.g., from a controller, from a regulatory authority, from any other suitable entities), negotiating (e.g., with a controller, with one or more other systems, etc.) for an assignment of one or more frequency ranges, and/or determining the frequency range(s) in any other suitable manner. Additionally or alternatively, the frequency range(s) can be predetermined (e.g., wherein the system is preconfigured to utilize the frequency range(s)) and/or determined in any other suitable manner.

Determining the size of the set of transmitters S212 preferably includes identifying each transmitter of the set (e.g., establishing direct and/or indirect communications with each transmitter of the set, such as using the communication modules of the elements; receiving one or more lists of transmitters that will participate in performance of the method, such as receiving via the communication module; selecting one or more transmitters from a list of available and/or known transmitters, such as transmitters with which the receiver and/or controller is preconfigured to operate; etc.), such as wherein the size of the set can be determined by counting these identified transmitters. However, determining the size of the set can additionally or alternatively include receiving a transmitter count indicative of the size of the set of transmitters (and/or the size of any suitable subsets of the set of transmitters) and/or determining the size of the set in any other suitable manner.

Assigning a frequency band to each transmitter of the set S213 (or to any suitable subset thereof) is preferably performed based on the size of the set of transmitters determined in S212 (or alternatively, based on the number of transmitters to which a frequency band will be assigned, such as in examples in which only a subset of the set of transmitters will receive a frequency band assignment) and on the frequency range(s) determined in S211. For example, S213 can include dividing the frequency range(s) into a number of non-overlapping frequency bands (e.g., of equal or substantially equal width) equal to (or greater than, such as in examples in which extra bands are allocated, such as to allow for their assignment to new transmitters without the need to determine new band assignments for the transmitters that already have assignments) the size of the set of transmitters (or alternatively, the number of transmitters to which a frequency band will be assigned), optionally with guard bands (e.g., of equal or substantially equal width to each other, but preferably significantly narrower than the frequency bands that will be assigned to the transmitters) separating the frequency bands to be assigned. Further, S213 preferably includes assigning each of these non-overlapping frequency bands (or any suitable subset of the bands) to a transmitter (preferably wherein each such band is assigned to a different transmitter, such as wherein the transmitters of the set and the assigned frequency bands define a one-to-one mapping). However, S213 can additionally or alternatively include any other suitable elements and/or be performed in any other suitable manner.

In one example, in which a 200 MHz wide band is available for performance of the method, assigning the frequency bands can include assigning a different 10 MHz wide band to each transmitter, with 1 MHz guard bands separating the assigned bands (e.g., wherein a first transmitter is assigned the range 2.4 to 2.41 GHz, a second transmitter is assigned the range 2.411 to 2.421 GHZ, a third transmitter is assigned the range 2.422 to 2.432 GHz, and so on).

In some variations, assigning frequency bands can include assigning frequency bands based on interference (e.g., wherein only frequency bands with sufficiently low interference are assigned). In a first example, S210 can include: monitoring noise levels within a band (e.g., the band available for performance of the method), optionally excluding one or more sub-bands within the monitored band (e.g., based on the detected noise levels, such as in response to detecting noise levels within the excluded sub-band greater than a threshold maximum noise level), and assigning only frequency bands that do not include (or alternatively, that minimize inclusion of portions or all of) the excluded sub-bands. In a second example, S210 can include: monitoring noise levels within a band (e.g., the band available for performance of the method); ranking, scoring, and/or otherwise determining evaluations of noise levels of one or more sub-bands within the monitored band; and assigning frequency bands based on the noise level evaluations (e.g., prioritizing assignment of frequency bands associated with lower noise levels, better scores, etc.).

However, the method can additionally or alternatively include assigning frequency bands in any other suitable manner.

2.2 Determining Encodings.

For each transmitter, determining encodings S220 preferably functions to map the value of a parameter to a frequency (or alternatively, a set of one or more frequencies) within the frequency band assigned to the transmitter.

In one embodiment, determining encodings can include determining a minimum representable parameter value (e.g., 0, a value corresponding to a noise floor, any other suitable minimum value, etc.), a maximum representable value (e.g., greater than or equal to the highest expected value, greater than or equal to the highest possible value, any other suitable maximum value, etc.), and a mapping function (e.g., linear function, logarithmic function, etc.) to map from the parameter value (e.g., from the range between the determined minimum and maximum values) to the range of assigned frequencies.

The encodings can be determined by the same entity (or entities) and/or process as the frequency band assignments, can be determined (e.g., independently) at each transmitter, and/or can be determined in any other suitable manner and/or by any other suitable entities.

The determined encodings are preferably communicated to one or more entities of the system (e.g., to the transmitter for which the encoding has been determined, if not determined by that transmitter; to the receiver and/or other entity that will decode the signals, if not determined by that entity; etc.). Communication of the encodings is preferably performed using the communication modules of any elements involved in such communications, but can additionally or alternatively be communicated in any other suitable manner.

Determining encodings is preferably performed in response to (and/or concurrent with) assigning frequency bands. However, the encodings can additionally or alternatively be determined with any other suitable timing and/or in any other suitable manner.

2.3 Calibrating Frequency Bands.

The method can optionally include calibrating frequency bands S230, which can function to account for mismatch (e.g., PLL mismatch) between each transmitter and the receiver.

To calibrate frequency bands, each transmitter preferably transmits two (or more) tones (e.g., the low and high ends of its assigned frequency band). The two tones are preferably not transmitted concurrently with each other (but, alternatively, can be transmitted concurrently and/or with any other suitable timing).

The different transmitters of the system can optionally perform frequency band calibration concurrently (e.g., wherein all transmitters of the system, or any suitable subset thereof, transmit concurrently with each other), but can alternatively, perform frequency band calibration serially, such as transmitting one at a time (e.g., consecutively). In one example, all transmitters of the system transmit a first tone corresponding to the low frequency end of their respective assigned frequency bands, and at a second time, transmit (e.g., concurrently with the other transmitters) a second tone corresponding to the high end of their respective frequency bands. However, the transmitters can additionally or alternatively transmit any other suitable tones with any suitable timing and/or in any other suitable manner.

Calibrating frequency bands preferably further includes, at the receiver, receiving the tones transmitted by each transmitter and determining the frequencies of each received tone.

Calibrating frequency bands preferably further includes acting based on the differences between the expected and received frequencies. In a first example, the receiver can adjust its internal understanding of each assigned frequency band (and the encoding associated with that band). For example, if the receiver assigned a first transmitter to a frequency band between 4.2 and 4.21 GHz, but received tones at 4.202 and 4.212 GHz, the transmitter can act as if the frequency band assigned to that transmitter was from 4.202 to 4.212 GHz, with the encoding mapped thereon in a manner analogous to the encoding determined as described above.

In a second example, calibrating frequency bands can additionally or alternatively include controlling each transmitter (or any suitable subset thereof, such as transmitters for which the difference between expected and received frequencies is greater than a threshold amount) to adjust their assigned band (and the encoding associated therewith), such as wherein the transmitter's internal understanding of the assigned band is altered such that its actual frequency transmission more closely matches the expectation of the receiver. For example, if a first transmitter was assigned a frequency band from 4.2 to 4.21 GHz and the receiver receives tones from that transmitter at 4.202 and 4.212 GHz, that transmitter can be instructed to adjust its frequency band assignment down by 20 MHz (e.g., wherein, after the adjustment, the adjusted frequency bands are preferably calibrated, such as by repeating tone transmission and tone transmission comparison to expected values and adjustment based on any differences therebetween).

However, calibrating frequency bands can additionally or alternatively include any suitable combination of the actions described above, and/or can additionally or alternatively include acting based on the difference between expected and received frequencies in any other suitable manner.

The frequency band calibration can optionally be mediated via communications performed using the communications modules of the elements involved (e.g., wherein the receiver can send a request via its communication module for each transmitter to transmit its calibration tones, such as sending a first request to transmit the low frequency tone and a second request to transmit the high frequency tone, or sending a single request indicative of an instruction to first transmit one tone and then transmit the other tone, such as after a predetermined time interval). However, frequency band calibration can additionally or alternatively be coordinated in any other suitable manner.

The frequency bands are preferably calibrated in response to their assignment. Further, the frequency bands can additionally or alternatively be calibrated periodically (e.g., every few seconds), such as to account for PLL drift between the receiver and transmitters. However, calibrating frequency bands can additionally or alternatively be performed with any other suitable timing.

Further, the method can additionally or alternatively include calibrating frequency bands in any other suitable manner.

2.4 Transmitting Signals.

Transmitting signals S240 preferably functions to provide information rapidly (e.g., with low latency). In some embodiments, transmitting signals can function to provide information concurrently from multiple endpoints (e.g., from each transmitter of the system).

Transmitting signals preferably includes, at each transmitter of the system (or any suitable subset of transmitters): determining a value to be communicated (e.g., based on a measurement made at the transmitter); mapping the value to a frequency (e.g., based on the encoding determined for the transmitter, such as described above regarding determining encodings); and transmitting a tone at the frequency.

Transmitting signals can be performed continuously (e.g., updating the transmission frequency based on updated values and/or measurements), periodically (e.g., transmitting continuously throughout each period, transmitting for a portion of each period, etc.), and/or with any other suitable timing.

Transmitting signals is preferably performed concurrently by all transmitters of the system (or any suitable subset of the transmitters), but can additionally or alternatively be performed consecutively by the different transmitters (and/or different groups of transmitters, wherein the transmitters of each group transmit concurrently with each other) and/or with any other suitable timing.

In one embodiment, the system includes a plurality of wireless power targets, wherein each such target (or any suitable subset thereof) preferably includes a transmitter of the system (and can optionally include a receiver of the system and/or any other suitable elements). In this embodiment, S240 preferably includes, at each transmitter (or any suitable subset of transmitters), transmitting information indicative of power reception at the target (e.g., indicative of the amount of power received at the target). For example, the method can include one or more elements such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference (e.g., the information indicative of power reception at a target can be determined such as described therein, the method can additionally or alternatively include transmitting power wirelessly to one or more targets, such as transmitting power from a node including and/or communicatively connected to the receiver of the system).

However, the method can additionally or alternatively include transmitting signals in any other suitable manner.

2.5 Receiving Signals.

Receiving signals S250 preferably functions to receive a tone (or multiple tones) from each transmitter. Receiving signals is preferably performed at the receiver (e.g., at the receive circuit thereof). Receiving signals preferably includes receiving the transmitted signals (e.g., concurrently receiving the transmitted signals from each transmitter or any suitable subset thereof) and determining the frequency of each received tone.

Receiving signals can be performed continuously (e.g., updating the determined frequencies as the transmission frequencies change), periodically (e.g., updating the determined frequencies each period), and/or with any other suitable timing (e.g., in response to a desire or need for updated information). For example, after changing a power transmission configuration, the method can include allowing time for each power receiver to perform internal optimizations and transmit information indicative of updated measurements, then sampling the updated information.

However, the method can additionally or alternatively include receiving signals in any other suitable manner.

2.6 Decoding Signals.

Decoding signals S260 preferably functions to decode the transmitted information. For each received tone, decoding signals preferably includes determining the corresponding transmitter from which the tone originated (e.g., based on the assigned frequency bands) and the corresponding value represented by the tone (e.g., based on the encoding determined for the corresponding transmitter).

Decoding signals is preferably performed in response to receiving signals. However, decoding signals can additionally or alternatively be performed continuously, periodically, in response to triggers such as needs or desires for updated information, and/or with any other suitable timing. Decoding signals can be performed at the transmitter, at a separate controller, and/or at any other suitable entities.

However, the method can additionally or alternatively include decoding signals in any other suitable manner.

2.7 Acting Based on Signals.

The method can optionally include acting based on signals S270, which can function to enable use of the signals (e.g., the decoded signals). S270 can be performed after (e.g., in response to) S260, but can additionally or alternatively be performed with any other suitable timing. S270 can be performed at the receiver(s), at the control node(s), at any other suitable elements communicatively connected to the receiver(s), and/or at any other suitable elements.

In one embodiment, in which the system includes a plurality of wireless power targets, wherein each such target (or any suitable subset thereof) preferably includes a transmitter of the system (and can optionally include a receiver of the system and/or any other suitable elements), and in which S240 includes, at each transmitter (or any suitable subset of transmitters), transmitting information indicative of power reception at the target (e.g., indicative of the amount of power received at the target), S270 can include acting based on the received information (e.g., which is indicative of power reception at each of the targets from which a transmission was received in S250). For example, the method can include one or more elements such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference (e.g., the information indicative of power reception at one or more targets can be used such as described therein, such as used in performance of an optimum search and/or other approach to modifying power transmission parameters).

In a specific example of this embodiment, S270 can include, based on the information indicative of power reception at one or more targets, determining modified power transmission parameters (e.g., according to an optimum search algorithm being implemented in performance of the method) for one or more power transmitters, transmitting power from the one or more power transmitters based on the modified power transmission parameters, receiving power at the one or more targets (and/or any other suitable subset thereof, and/or any other suitable targets), and determining information indicative of power reception (e.g., at each target, determining information indicative of power reception at that target), wherein the method can further include repeating any suitable elements of the method (e.g., repeating S220, S240, S250, S260, and S270, such as wherein S270 is performed as described regarding this specific example and/or wherein S270 includes determining that a convergence criterion has been reached and so not continuing to repeat the method elements; repeating only a subset of the aforementioned elements; also repeating S210 and/or S230; etc.). Additionally or alternatively (e.g., after performing multiple iterations of S270 and/or other elements of the method), S270 can include determining that a convergence criterion has been reached (e.g., optimum search completed) and, in response to determining that the convergence criterion has been reached, determining one or more desired power transmission configurations and transmitting based on the desired power transmission configuration(s); note that the method can optionally include continuing to repeat some or all of the method elements (e.g., repeating S220, S240, S250, S260, and S270, such as wherein S270 includes assessing whether the power transmission configuration(s) are still performing adequately, such as performing within a threshold percentage of the original or best configuration, and if the power transmission configuration(s) are no longer adequate, initiating a new optimum configuration search; repeating only a subset of the aforementioned elements; also repeating S210 and/or S230; etc.) while transmitting based on the desired power transmission configuration(s), such as to monitor performance of the power transmission configuration(s).

However, S270 can additionally or alternatively include acting based on the signals in any other suitable manner.

Further, the method can additionally or alternatively include any other suitable elements performed in any suitable manner.

3. System

3.1 Transmitters.

The system preferably includes one or more transmitters 110. Each transmitter preferably functions to transmit information. Each transmitter preferably includes a communication module and a configurable tone transmitter 110a. The transmitter can optionally include a controller and/or any other suitable elements.

The communication module preferably functions to enable bidirectional communication (e.g., with other elements of the system, such as the receiver, a control node, other transmitters, and/or any other suitable elements), preferably wireless communication. The communication module preferably supports (e.g., enable communication using) one or more wireless communication protocols (e.g., WiFi, Bluetooth, BLE, NFC, RF, IR, Zigbee, Z-wave, etc.), but can additionally or alternatively support communication in any other suitable manner. However, the communication module can additionally or alternatively include any other suitable elements and/or implement any other suitable functionality.

Figure 3:
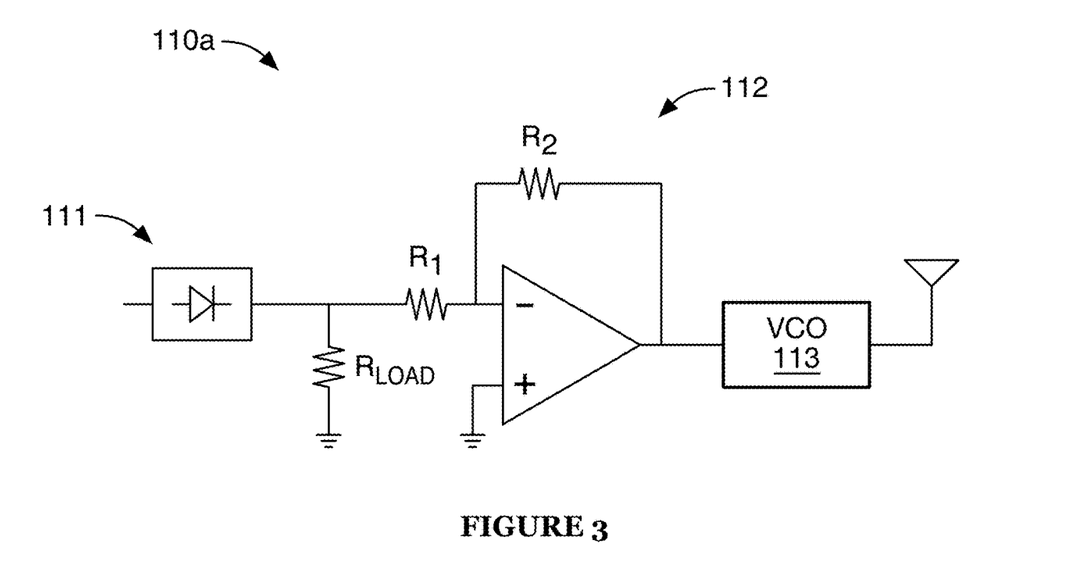
FIG. 3 is a schematic representation of an example of a transmitter of the communication system.

The configurable tone transmitter preferably functions to wirelessly transmit a tone at a desired frequency. Optionally, the configurable tone transmitter can be operable to transmit multiple tones concurrently. In one example (e.g., as shown in FIG. 3), the configurable tone transmitter includes an input diode 111, an amplifier network 112 (e.g., op-amp network, such as an inverting op-amp network, preferably including one or more tunable elements, such as variable resistors), and a voltage-controlled oscillator 113 (VCO) that receives an input voltage (e.g., from the diode via the amplifier network) and outputs a tone at a frequency proportional to the input voltage (e.g., configurable VCO, such as wherein the proportionality constant between the input voltage and the output tone frequency is adjustable; non-configurable VCO; etc.), preferably wherein the tone is transmitted by one or more antennas coupled to the VCO output. However, the transmitter can additionally or alternatively include any other suitable configurable tone transmitters.

The controller can optionally function to control one or more other elements of the transmitter (e.g., communication module, configurable tone transmitter, etc.) to determine the frequency to transmit and/or to perform any other suitable control functions. Additionally or alternatively, the system can include one or more control nodes (e.g., separate from the transmitter, such as part of the receiver, part of other transmitters, standalone control node, etc.) which can function to perform any or all of the control tasks for the transmitter.

Further, the system can additionally or alternatively include any other suitable elements. For example, the system can include a detector (e.g., configured to determine the value of a parameter of interest), wherein the transmitted frequency can be determined based on a measurement sampled by the detector.

In one embodiment, the system includes a plurality of wireless power targets, wherein each such target (or any suitable subset thereof) preferably includes a transmitter of the system (and can optionally include a receiver of the system and/or any other suitable elements). In this embodiment, each transmitter preferably transmits information indicative of power reception at the target (e.g., indicative of the amount of power received at the target). For example, each such target (or any suitable subset of the targets) can include one or more elements such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference (e.g., each such target, or any suitable subset of the targets, can include one or more elements such as described in U.S. patent application Ser. No. 18/108,312 regarding the "receive node", "relay node", and/or "hybrid node" and/or any suitable elements thereof).

However, the transmitter can additionally or alternatively include any other suitable elements.

3.2 Receiver.

The receiver 120 preferably functions to receive information (e.g., concurrently from multiple transmitters). In some embodiments, the system can optionally include multiple receivers (e.g., wherein each such receiver is operable to receive and/or process information from the transmitters independently). The receiver preferably includes a communication module and a receive circuit. Further, the receiver can additionally or alternatively include a controller and/or any other suitable elements.

The communication module preferably functions to enable bidirectional communication (e.g., with other elements of the system, such as the transmitters, a control node, other receivers, and/or any other suitable elements), preferably wireless communication. The communication module preferably supports (e.g., enables communication using) one or more wireless communication protocols (e.g., WiFi, Bluetooth, BLE, NFC, RF, IR, Zigbee, Z-wave, etc.), but can additionally or alternatively support communication in any other suitable manner. However, the communication module can additionally or alternatively include any other suitable elements and/or implement any other suitable functionality.

The receive circuit preferably functions to receive transmissions and determine their constituent frequencies. In examples, the receive circuit can be and/or include a spectrum analyzer, a software-defined radio, a spectral peak detector 120a, and/or any other suitable circuit.

Figure 4A:
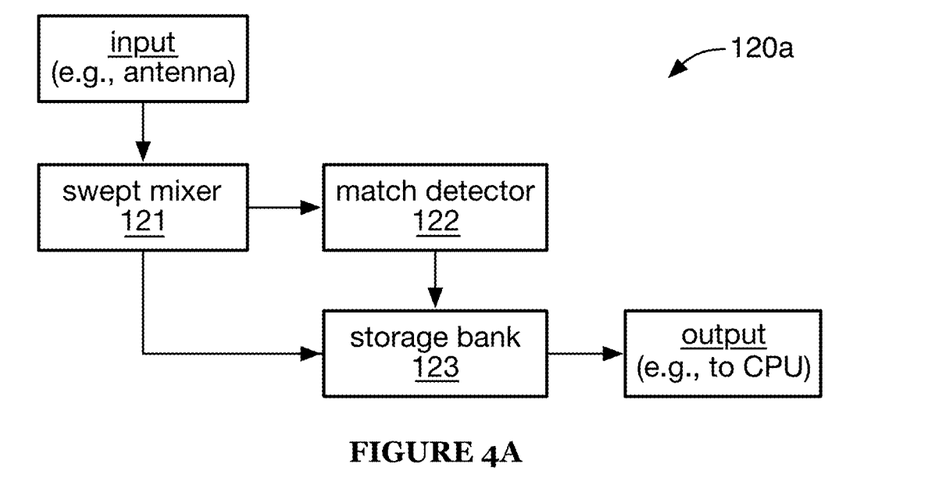
FIGS. 4A-4B are schematic representations of an embodiment of a spectral peak detector of the communication system, and an example of the embodiment, respectively.

In one embodiment, the receive circuit includes (e.g., is) a spectral peak detector. The spectral peak detector preferably includes a swept mixer 121, a match detector 122, and/or a storage bank 123 (e.g., as shown in FIG. 4A). The swept mixer preferably functions to mix a signal of varying frequency (e.g., a chirp) with the received signal. The match detector preferably functions to detect significant signals (e.g., significant substantially constant signals) at the output of the swept mixer (e.g., signals indicative of a tone present in the received signal). The storage bank preferably functions to store information indicative of the frequency corresponding to each detected signal (e.g., storing the voltage used to drive a VCO of the swept mixer). However, the spectral peak detector can additionally or alternatively include any other suitable elements in any suitable arrangement.

Figure 4B:
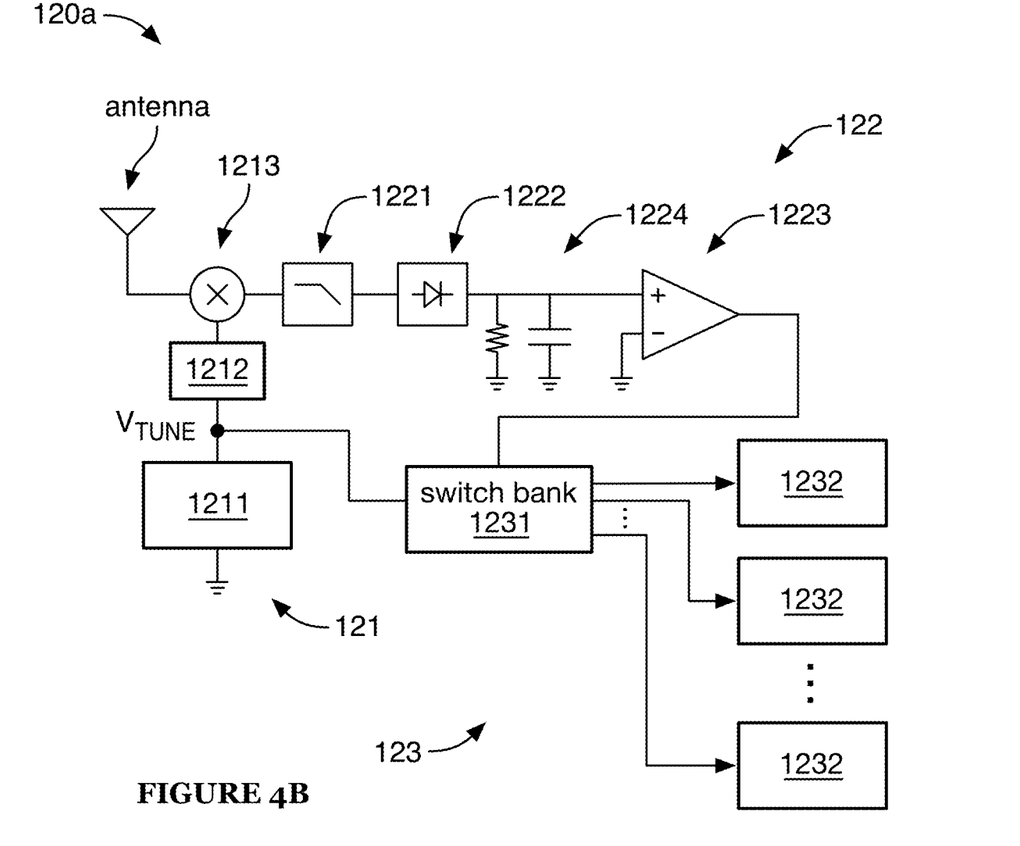
Figure 5:
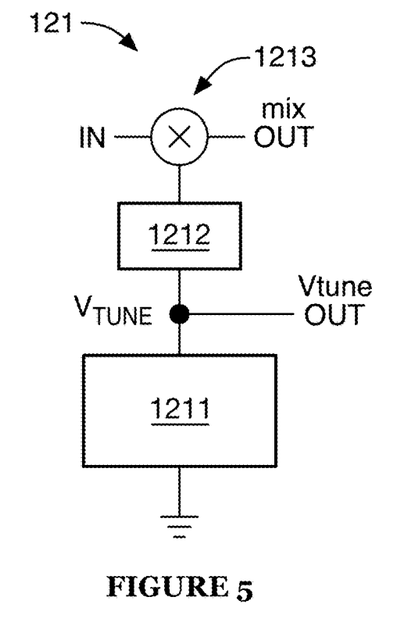
FIG. 5 is a schematic representation of an example of a swept mixer of the communication system.
Figure 6:
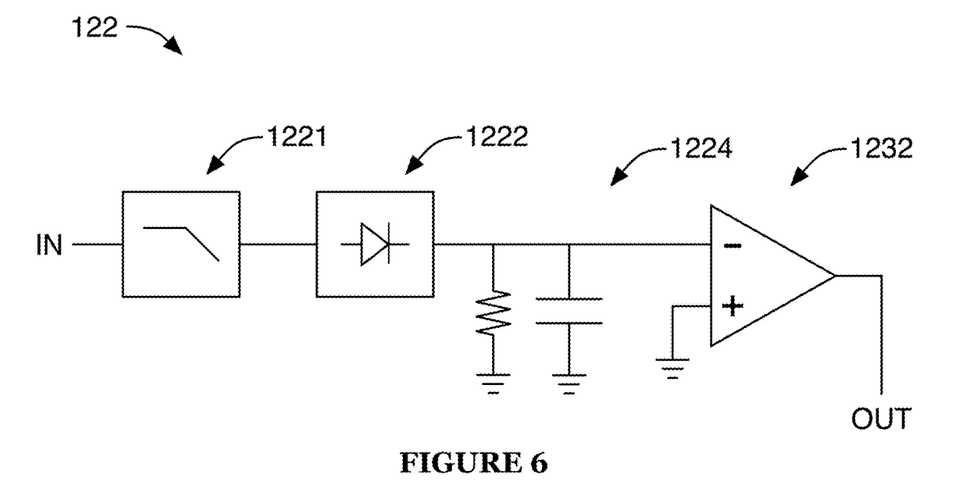
FIG. 6 is a schematic representation of an example of a match detector of the communication system.

In one example (e.g., as shown in FIG. 4B), the spectral peak detector includes a swept mixer 121, a match detector 122, and a storage bank 123 (e.g., as described above). The swept mixer includes a varying voltage input 1211 that controls a VCO 1212 to generate a variable frequency signal (e.g., a chirp), and a mixer 1213 that receives the generated varying frequency signal and the received signal, mixing them together to generate and output a mixed signal (e.g., as shown in FIG. 5). The match detector preferably receives the mixed signal from the swept mixer and passes it to a comparator 1223 (e.g., which outputs high if the signal voltage exceeds a preconfigured threshold), such as shown by way of example in FIG. 6. The match detector preferably also includes a low-pass filter 1221 and detector 1222 (e.g., nonlinear electrical component such as a diode detector), connected in series between the mixer output and the comparator and/or a transient quencher 1224 (e.g., one or more resistive and/or capacitive paths to ground) operable to suppress transients in the signal. The storage bank preferably includes a plurality of storage elements 1232 and a switch bank 1231 (e.g., as shown in FIG. 4B). The storage bank preferably includes at least one storage element for each peak to be detected (e.g., the number of storage elements should be equal to or greater than the greatest number of transmitters that the receiver can receive from concurrently, or substantially concurrently).

Figure 7:
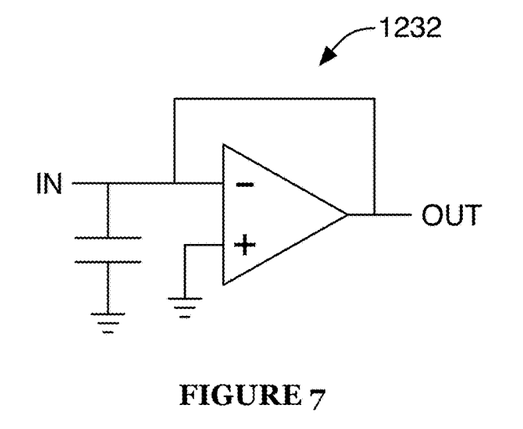
FIG. 7 is a schematic representation of an example of a storage element of the communication system.

Each storage element preferably functions to store a voltage level (e.g., voltage used to drive the VCO at the time the match was detected). In one example, each storage element 1232 includes a voltage buffer and a capacitor between the voltage buffer (e.g., inverting input of the op-amp) and ground (e.g., as shown in FIG. 7). However, the storage element can additionally or alternatively include any other suitable elements.

The switch bank is preferably coupled to the match detector and the varying voltage input of the swept mixer (e.g., receiving input values from both). In response to a high signal received from the match detector, the switch bank is preferably configured to couple the swept mixer voltage input to a storage element of the plurality (e.g., wherein when the match detector goes low, the switch bank is configured to decouple the swept mixer voltage input from the storage element such that the voltage buffer of the storage element remains at the relevant voltage, thereby storing it).

However, the receive circuit can additionally or alternatively include any other suitable elements in any suitable arrangement.

The receiver can optionally include a controller. The controller can function to control the communication module of the receiver, determine frequency band assignments, process received information, and/or perform any other suitable control functions. Additionally or alternatively, any or all of these control functions can optionally be performed by a different entity (e.g., separate control node, controller of one or more transmitters, etc.). However, the controller can additionally or alternatively have any other suitable functionality.

Further, the receiver can optionally include any other suitable elements. For example, the receiver can include a wireless power transmitter, wherein the received information can inform a feedback control loop of the wireless power transmitter.

In one embodiment, the system includes one or more wireless power transmitters, wherein each such wireless power transmitter (or any suitable subset thereof) preferably includes a receiver of the system (and can optionally include a transmitter of the system and/or any other suitable elements). In this embodiment, each receiver preferably receives information indicative of power reception at one or more targets of the system (e.g., indicative of the amount of power received at the target), such as wherein the received information can inform a feedback control loop of the wireless power transmitter. For example, each such wireless power transmitter (or any suitable subset of the wireless power transmitters) can include one or more elements such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", and/or U.S. patent application Ser. No. 18/087,052, filed 22 Dec. 2022 and titled "BIDIRECTIONAL RF CIRCUIT AND METHOD OF USE", each of which is herein incorporated in its entirety by this reference (e.g., each such wireless power transmitter, or any suitable subset of the wireless power transmitters, can include one or more elements such as described in U.S. patent application Ser. No. 18/108,312 regarding the "transmit node", "relay node", and/or "hybrid node" and/or any suitable elements thereof).

However, the system can additionally or alternatively include any other suitable receivers and/or transmitters. Further, the system can additionally or alternatively include any other suitable elements in any suitable arrangement.

4. Exemplary Embodiment

In an exemplary embodiment, the system includes one or more power transmitters (e.g., source nodes, mesh nodes, relay nodes, etc.) configured to transmit power wirelessly to one or more targets (e.g., by controlling one or more phased arrays, such as a phased array of each source node, to transmit power to the one or more targets; by controlling one or more metasurfaces, such as a metasurface of each relay node, to redirect and/or refocus power incident on the metasurface(s) toward the one or more targets; etc.). Each power transmitter preferably includes a receiver such as described above regarding the communication system, and each target (or any suitable subset of the targets) preferably includes a transmitter such as described above regarding the communication system.

The one or more power transmitters (which may also be referred to as supply nodes) preferably use information received from the targets in order to inform their operation. For example, this information can be used in configuring (e.g., optimizing) power transmission from the power transmitter(s) (e.g., wherein power transmitter configuration is determined based in part or entirely on this information). In some examples, the information is used such as described in U.S. patent application Ser. No. 17/006,242, filed 28 Aug. 2020 and titled "METHOD AND SYSTEM FOR WIRELESS POWER DELIVERY", U.S. patent application Ser. No. 18/108,312, filed 10 Feb. 2023 and titled "SYSTEM AND METHOD FOR WIRELESS POWER NETWORKING", U.S. patent application Ser. No. 18/087,052, filed 22 Dec. 2022 and titled "BIDIRECTIONAL RF CIRCUIT AND METHOD OF USE", and/or U.S. patent application Ser. No. 17/029,408, filed 23 Sep. 2020 and titled "METHOD AND SYSTEM FOR WIRELESS POWER DELIVERY", each of which is herein incorporated in its entirety by this reference (e.g., wherein the information includes information such as described regarding "measuring results of the transmission S222" in U.S. patent application Ser. No. 17/029,408, wherein each target (or any suitable subset of the targets) communications the measured results (and/or any suitable information derived based on and/or otherwise associated with the measured results) to the wireless power transmitter and/or any other suitable entities, preferably communicating these results using the transmitter and/or receiver described herein and/or by performing the method described herein)

In an example of this embodiment, the method can include at the power transmitter, transmitting power wirelessly under a transmitter configuration, at each power receiver, characterizing power reception (e.g., measuring incident power, power coupled into the receiver, etc.) and transmitting a value indicative of the power reception characterization (mapped to a tone frequency within the band assigned to the transmitter of that power receiver), and at the power transmitter (e.g., at the receiver thereof), receiving and decoding the transmissions from the power receivers (e.g., to determine the power reception characterizations) and, based on the power reception characterizations, determining an updated transmitter configuration for wireless power transmission. The method preferably includes repeating all of the elements described above using the updated transmitter configuration to wirelessly transmit power (e.g., wherein the elements of the method are repeated until a criterion is satisfied, such as a convergence criterion, a maximum iterations criterion, etc.).

However, the system and/or method can additionally or alternatively include any other suitable elements.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken line in the figures. However, unbroken lines in the figures should not be interpreted to indicate that the depicted elements are essential or may not be omitted from variants of the invention.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for wireless communication, the method comprising:
   during a first time interval, at a power transmitter, wirelessly transmitting power via propagating electromagnetic radiation to a plurality of target nodes, comprising wirelessly transmitting power based on a first power transmission configuration, wherein:
      the plurality of target nodes is associated with a plurality of frequency bands and a plurality of mappings;
      each target node of the plurality of target nodes is associated with a different frequency band of the plurality of frequency bands; and
   at each target node of the plurality:
      during the first time interval, receiving power wirelessly from the power transmitter;
      based on the power received at the target node, determining a respective value of a respective parameter associated with power reception at the target node;
      based on the respective value and a respective mapping of the plurality of mappings, wherein the respective mapping is a mapping between values of the respective parameter and frequencies of the respective frequency band associated with the target node, determining a respective frequency indicative of the respective value; and substantially throughout a second time interval after the first time interval, transmitting a respective tone at the respective frequency;

at a communications receiver, during the second time interval, receiving a plurality of tones from the plurality of target nodes, wherein the plurality of tones comprises, for each target node of the plurality, the respective tone transmitted by the target node;

at the communications receiver, determining a plurality of frequencies by determining, for each tone of the plurality of tones, the respective frequency of the tone, wherein the plurality of frequencies comprises the respective frequency;

determining a plurality of values based on the plurality of frequencies and the plurality of mappings, comprising determining, for each frequency of the plurality, the respective value mapped to the frequency;

based on the plurality of values and the first power transmission configuration, determining an updated power transmission configuration; and in response to determining the updated power transmission configuration, at the power transmitter, wirelessly transmitting power based on the updated power transmission configuration.

2. The method of claim 1, further comprising, before the first time interval, for each target node of the plurality, determining the respective mapping.

3. The method of claim 2, further comprising determining the plurality of frequency bands, wherein determining the plurality of frequency bands comprises: for each target node of the plurality, before determining the respective mapping, assigning the respective frequency band to the target node.

4. The method of claim 3, wherein determining the plurality of frequency bands further comprises:

determining a frequency range;

selecting, from the frequency range, n non-overlapping frequency bands, wherein n is an integer number equal to the number of target nodes in the plurality of target nodes;

assigning each of the n non-overlapping frequency bands to a different target node of the plurality, comprising assigning a first frequency band of the n non-overlapping frequency bands to a first target node of the plurality of target nodes;

in response to assigning each of the n non-overlapping frequency bands, at each target node of the plurality, based on the respective non-overlapping frequency band assigned to the target node, transmitting a respective set of calibration tones, comprising, at the first target node, transmitting a first set of calibration tones based on the first frequency band;

at the communications receiver, receiving a plurality of calibration tones, comprising receiving the first set of calibration tones; and based on the first set of calibration tones, determining an adjusted frequency band different from the first frequency band, wherein the adjusted frequency band overlaps the first frequency band and does not overlap the other frequency bands of the n non-overlapping frequency bands;

wherein, for the first target node, assigning the respective frequency band to the target node comprises assigning the adjusted frequency band to the first target node.

5. The method of claim 3, wherein:

determining the plurality of frequency bands further comprises:

determining a frequency range; and selecting, from the frequency range, the plurality of frequency bands, wherein the plurality of frequency bands consists of n non-overlapping frequency bands of substantially equal bandwidth, wherein n is an integer number equal to the number of target nodes in the plurality of target nodes; and the method further comprises, after the second time interval:

determining a second plurality of target nodes, wherein the second plurality of target nodes consists of m target nodes, wherein m is greater than n;

selecting, from the frequency range, a plurality of updated frequency bands that consists of m non-overlapping frequency bands of substantially equal bandwidth, wherein each frequency band of the plurality of frequency bands has a bandwidth greater than a bandwidth of each updated frequency band of the plurality of updated frequency bands;

assigning each updated frequency band of the plurality of updated frequency bands to a different target node of the second plurality of target nodes;

based on the plurality of updated frequency bands, determining an updated plurality of mappings;

at each target node of the plurality:

while the power transmitter wirelessly transmits power based on the updated power transmission configuration, receiving respective second power wirelessly from the power transmitter;

based on the respective second power, determining a respective updated value of the respective parameter associated with power reception at the target node;

based on the respective updated value and a respective mapping of the updated plurality of mappings, wherein the respective mapping is a mapping between values of the respective parameter and frequencies of the respective updated frequency band associated with the target node, determining a respective updated frequency indicative of the respective updated value; and substantially throughout a third time interval after receiving respective second power wirelessly from the power transmitter, transmitting a respective updated tone at the respective updated frequency;

at the communications receiver, during the third time interval, receiving a second plurality of tones from the plurality of target nodes, wherein the second plurality of tones comprises, for each target node of the plurality, the respective updated tone transmitted by the target node;

at the communications receiver, determining a second plurality of frequencies by determining, for each updated tone of the second plurality of tones, the respective updated frequency of the tone, wherein the second plurality of frequencies comprises the respective updated frequency;

determining a second plurality of values based on the second plurality of frequencies and the plurality of updated mappings, comprising determining, for each frequency of the second plurality, the respective updated value mapped to the frequency; and based on the second plurality of values and the updated power transmission configuration, evaluating the updated power transmission configuration.

6. The method of claim 2, wherein, for each target node of the plurality, determining the respective mapping comprises:
- at the target node, based on the respective frequency band associated with the target node, determining the respective mapping; and
- after determining the respective mapping, communicating information indicative of the respective mapping to the communications receiver.

7. The method of claim 1, wherein, for each target node of the plurality, the respective parameter is directly proportional to a respective amount of power received at the target node during the first time interval.

8. The method of claim 1, further comprising, after the second time interval:
- at each target node of the plurality:
  - while the power transmitter wirelessly transmits power based on the updated power transmission configuration, receiving respective second power wirelessly from the power transmitter;
  - based on the respective second power, determining a respective updated value of the respective parameter associated with power reception at the target node;
  - based on the respective updated value and the respective mapping, determining a respective updated frequency indicative of the respective updated value; and
  - substantially throughout a third time interval after receiving respective second power wirelessly from the power transmitter, transmitting a respective updated tone at the respective updated frequency;
- at the communications receiver, during the third time interval, receiving a second plurality of tones from the plurality of target nodes, wherein the second plurality of tones comprises, for each target node of the plurality, the respective updated tone transmitted by the target node;
- at the communications receiver, determining a second plurality of frequencies by determining, for each updated tone of the second plurality of tones, the respective updated frequency of the tone, wherein the second plurality of frequencies comprises the respective updated frequency;
- determining a second plurality of values based on the second plurality of frequencies and the plurality of mappings, comprising determining, for each frequency of the second plurality, the respective updated value mapped to the frequency; and
- based on the second plurality of values and the updated power transmission configuration, evaluating the updated power transmission configuration.

9. The method of claim 1, wherein determining the plurality of frequencies comprises:
- mixing the plurality of tones with a variable-frequency tone to generate a downmixed signal; and
- detecting, based on the downmixed signal, that the variable-frequency tone matches a tone of the plurality of tones.

10. The method of claim 9, wherein determining the plurality of frequencies further comprises:
- generating the variable-frequency tone by providing a voltage signal to a voltage-controlled oscillator, wherein the voltage signal varies with time; and
- in response to detecting that the variable-frequency tone matches the tone, at a voltage buffer, storing the voltage signal.

* * * * *